UNITED STATES PATENT OFFICE.

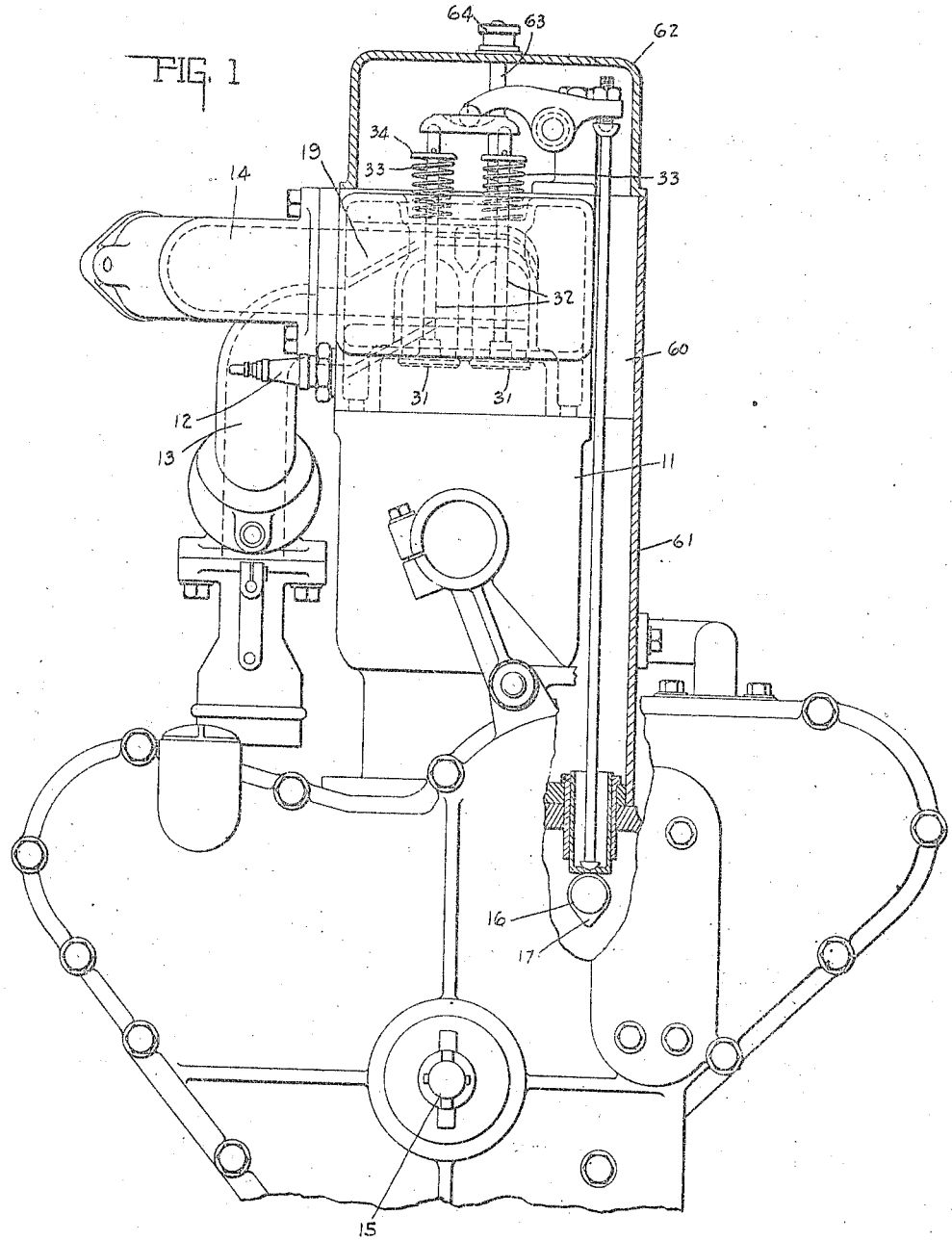

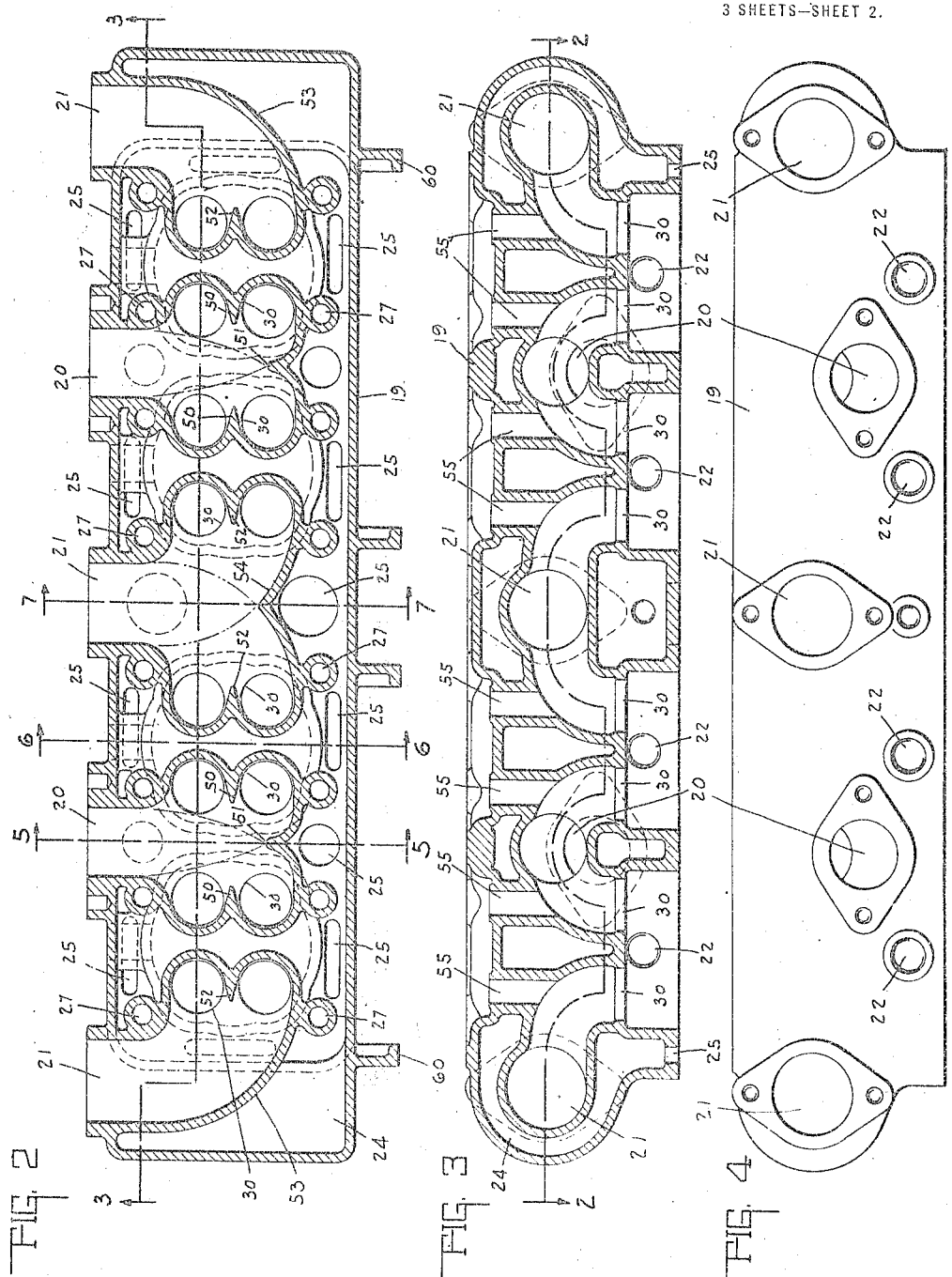

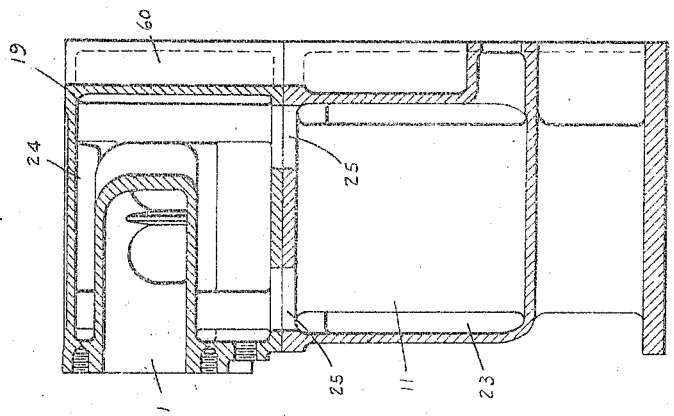
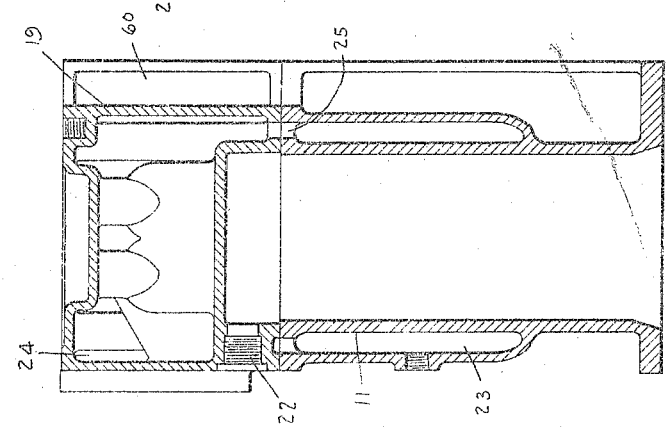
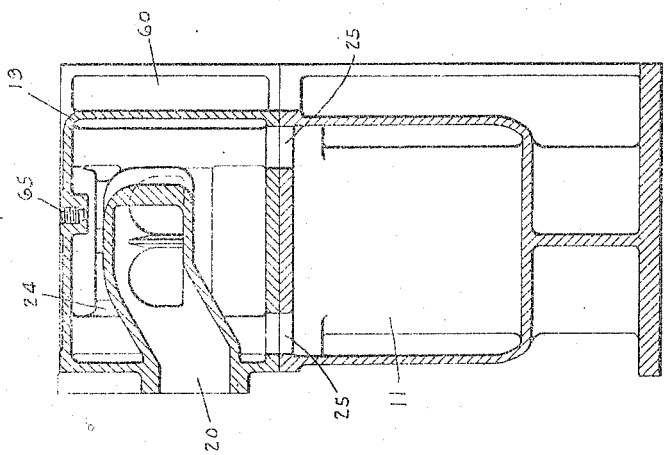

ROBERT M. ROOF, OF ANDERSON, INDIANA.

INTERNAL-COMBUSTION ENGINE.

1,416,977.   Specification of Letters Patent.   Patented May 23, 1922.

Application filed June 21, 1920. Serial No. 390,449.

*To all whom it may concern:*

Be it known that I, ROBERT M. ROOF, a citizen of the United States, and a resident of Anderson, county of Madison, and State of Indiana, have invented a certain new and useful Internal-Combustion Engine; and I do hereby declare that the following is a full, clear, and exact description thereof, reference being had to the accompanying drawings, in which like numerals refer to like parts.

This invention relates to internal combustion engines, and in particular to the cylinder head construction thereof.

The chief object of this invention is to provide an internal combustion engine with a cylinder head, the use of which increases the efficiency of the engine.

One feature of the cylinder head consists in providing dual valve means in place of the unitary valve means heretofore employed which permits for the same valve area, of the use of smaller valves which, although constructed substantially similar, will operate such that one of the valves opens or "cracks" before the other.

A further feature of the invention consists in positioning the intake manifold and the exhaust manifold upon the same side of the cylinder, and constructing the cylinder such that the intake and exhaust ports open from the same side into the respective manifolds.

Another feature of the invention consists in constructing the ports of the cylinder head such that the gases are provided with an improved and unobstructed passage.

A further feature of the invention is the partition means associated with the dual or plural valve construction in the exhaust port, whereby the exhaust gases from each of the valves is deflected into the main exhaust port and from the other valve means.

The full nature of the invention will be understood from the accompanying drawings and the following description and claims.

In the drawings Fig. 1 is an end elevational view of a cylinder head applied to an internal combustion engine, parts being shown in section, and others being broken away to show the valve actuating means. Fig. 2 is a sectional and plan view taken on line 2—2 of Fig. 3 and in the direction of the arrows. Fig. 3 is a sectional and elevational view taken on line 3—3 of Fig. 2 and in the direction of the arrows. Fig. 4 is a side elevational view of the cylinder head showing the arrangement of the exhaust and intake ports. Fig. 5 is a transverse sectional view taken on line 5—5 of Fig. 2. Fig. 6 is a transverse sectional view taken on line 6—6 of Fig. 2 and looking in the direction of the arrows. Fig. 7 is a transverse sectional view taken on line 7—7 of Fig. 2.

In the drawings the improved cylinder head is designated by the numeral 19, said head being secured to and upon the cylinder block or blocks 11 of an internal combustion engine. In Fig. 1 the usual parts of an internal combustion engine are illustrated to show the relationship of said cylinder head to the remaining parts of the engine. In said figure, 12 indicates the spark plug, 13 the intake conduit communicating with the usual intake manifold, 14 the exhaust conduit communicating with the usual exhaust manifold, 15 the crank shaft, 16 the valve operating cam shaft, preferably driven by the crank shaft. Upon the cam shaft 16 is a cam member 17 for operating one valve or a plural valve construction.

Figs. 1, 2, 3 and 4 clearly illustrate the arrangement of the exhaust and intake ports within the improved cylinder head. The embodiment of the invention illustrates a four cylinder engine. When the improvements in the cylinder head are incorporated in a four cylinder engine, the ports are arranged as follows: The cylinder head is provided with two intake ports and chambers 20. Each of said ports 20 is in communication with two adjacent cylinders. The cylinder head is provided with three exhaust ports and chambers 21, one being positioned between the two intake ports 20, and one being positioned upon the opposite side of each of the intake ports 20. As shown in Figs. 1 and 4, the exhaust ports 21 are positioned slightly above the intake ports 20. Between each of the intake ports 20 and exhaust ports 21 there is provided the usual threaded spark plug receiving opening 22.

The main body portion of the cylinder body 11 is provided with the water jacketing spaces 23. The cylinder head 19 is similarly provided with water jacketing spaces 24 which communicate with the water jacketing spaces 23 by suitable channel means 25 between the same, the cylinder head and the cylinder being provided with suitable packing or gasket means not shown for securing a leak-proof connection between the same by means of bolts (not shown) extending through the openings 27. Said bolts also may be adapted to rigidly secure the cylinder head 19 to the cylinder block 11.

Each of the cylinders is provided with four similar valved ports 30, each being adapted to receive a similar valve member 31. Each valve 31 is provided with stems 32 which extend upwardly through the openings 55 in the cylinder head and carry upon their upper ends spring members 33. The spring 33 normally maintains said valve 31 in the seated position, said spring 33 being secured between the cylinder head and a washer 34 suitably secured to the stem 33.

The particular arrangement of the intake ports 20 and the exhaust ports 21 with the valve ports 30 communicating therewith is shown in detail in Figs. 2 to 7 inclusive, and reference will be had thereto. As previously stated, each intake port 20 communicates with two adjacent cylinders, and since the valve ports 30 in each cylinder are substantially similar, said valves may be used interchangeably for exhaust or intake valves, as described. Thus, in Fig. 2, the four adjacent valve ports 30 in each of the two adjacent cylinders communicate with the intake ports. Each of the several intake ports 30 communicates with the intake port 20, and the cylinder wall adjacent thereto is formed such that the direction of the incoming gases is regulated by the separating and projecting partition 50 between each two of the ports communicating with the same cylinder. Similarly, the two adjacent ports, each of which communicates with an adjacent cylinder, is separated by a deflecting partition 51. When the cylinder wall or chamber is arranged as shown, substantially equal amounts of gas or fuel is supplied through each of the valves 30.

As heretofore described, the exhaust ports 21 are three in number, the middle one of which communicates with two of the cylinders through the adjacent ports of the adjacent cylinders. Each of the other two ports 21 communicate with the two adjacent ports 30 of each of the end cylinders. A partition wall 52 is similar in construction to the partition wall 50 described with relation to the intake valves, but in this instance the partition wall 52 serves to deflect the heated and exhausted gases into the exhaust port 21. In addition to deflecting said gases, said partition separates the gases discharging from the different ports, so that the mechanism of one valve is protected from the gases of the other valve when the same opens or "cracks" before the first mentioned valve opens.

In each of the intake ports 20, the projecting partition 51 is positioned such that the gases have free passage to either of the cylinders, said passage in each instance being designated by the broken lines in Fig. 2. Similarly, each of the end exhaust ports is provided with a curved wall 53, which deflects the exhausting gases from the end cylinders and simultaneously provides a free passage therefrom. In much the same manner, the middle exhaust port 21 is provided with an inwardly extending partition member 54, which is positioned such that a free passage is maintained from each of the valves of the adjacent cylinder, said free passage in this instance being shown by the dotted lines in the center of Fig. 2. When the cylinder head is constructed in the manner shown, the flow of gases to and from the intake and exhaust ports from the valves is unobstructed, and the friction is reduced to a minimum.

With the construction shown herein, see Figs. 1, 2, 3 and 4, the intake manifold and exhaust manifold and the ignition system all may be positioned upon one side of the engine, leaving the other side free to receive and support the valve operating mechanism, said valves being positioned in the heads of the cylinders rather than in the side, as has heretofore been the usual practice. This arrangement of the manifolds, spark plugs, and valve operating mechanism permits the cylinder head when installed upon an engine of the V-block type to utilize a common intake line and a common exhaust line.

Suitable protecting means are provided for protecting the valve mechanism hereinbefore described, and said means comprises outwardly projecting portions, such as the flanged brackets 60 positioned upon the valve side of the cylinder, see Figs. 2, 8 and 9. Suitable protecting plate means 61 are adapted to be secured to the flanged brackets 60 and protect the valve operating rods 43 from casual injury. A suitable cover cap 62 is adapted to be secured to the cylinder head 19 by the bolt and nut means 63 and 64 respectively, see Fig. 1, said bolt means being seatable in the threaded openings 65, see Figs. 8 and 9.

The invention claimed is:

1. A cylinder head construction for a multi-cylindered internal combustion engine, including a plurality of chambers, an exhaust chamber and an intake chamber of said chambers communicating with each cylinder, exhaust chambers of two adjacent cylinders communicating with each other within the cylinder head, intake chambers of two adjacent cylinders communicating with each other within the cylinder head, all of said chambers opening on the same side of the engine, and a plurality of valves in each chamber.

2. A cylinder head construction for a four cylinder internal combustion engine, including an intake manifold and an exhaust manifold upon the same side, comprising a pair of separated chambers for each cylinder, one chamber being adapted to discharge gases from the cylinder and the other of said pair of chambers being adapted to supply fuel to said cylinder, the six intermediate chambers being grouped in pairs, each pair communicating with each other within the cylinder head, said cylinder head being provided with but five openings upon the same side, three being adapted to be connected to one manifold and the other two to the other manifold, said five openings being positioned in staggered relation, the end openings each communicating with one of said chambers, and each of the intermediate openings communicating with one of said pairs of communicating chambers.

3. A cylinder head construction for a four cylinder internal combustion engine, including an intake manifold and an exhaust manifold comprising a pair of separated chambers for each cylinder, one chamber being adapted to discharge gases from the cylinder and the other of said pair of chambers being adapted to supply fuel to said cylinder, said cylinder head being provided with but five openings upon the same side, three being adapted to be connected to one manifold and the other two to the other manifold, said five openings being positioned in staggered relation, the end openings each communicating with one of said chambers, and each of the intermediate openings communicating with two of said chambers, and a plurality of valves in each chamber.

4. A cylinder head construction for a four cylinder internal combustion engine, including an intake manifold and an exhaust manifold upon the same side of the engine comprising a pair of separated chambers for each cylinder, one chamber being adapted to discharge gases from the cylinder and the other of said pair of chambers being adapted to supply fuel to said cylinder, the six intermediate chambers being grouped in pairs and opening upon the same side of the cylinder head, each pair communicating with each other within the cylinder head, said cylinder head being provided with but five openings upon the same side of the cylinder head, three being adapted to be connected to one manifold and the other two to the other manifold, said five openings being positioned in staggered relation, the end openings each communicating with one of said chambers, each of the intermediate openings communicating with one of said pair of communicating chambers, and a plurality of valves in each chamber.

5. An overhead valve construction for a cylinder, including four valve ports, a pair of passages within the cylinder, each passage communicating with a pair of said ports, the walls of each passage being curved outwardly in elbow formation, and the head of each of said passages between the ports being extended forwardly and curved to form a partition therebetween and provide a free passage for the gases within said cylinder through said passage to and from the ports.

6. An overhead valve construction for two cylinders including four valve ports, a pair of passages within the cylinder, each communicating with a pair of said ports and with each other, the walls of each of said passages being curved outwardly in elbow formation and the head of each of said passages between the ports being extended forwardly to form a partition and the wall between said passages at its junction being curved to form a free passage for the gases within said cylinder.

In witness whereof, I have hereunto affixed my signature.

ROBERT M. ROOF.